(12) United States Patent
Browne (10) Patent No.: US 6,476,809 B1
(45) Date of Patent: Nov. 5, 2002

(54) IMAGE PROCESSING METHOD FOR MOSAIC EFFECT WITH ADAPTIVE TESSELLATION

(75) Inventor: Cameron Bolitho Browne, Burleigh Heads (AU)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/276,669

(22) Filed: Mar. 26, 1999

(30) Foreign Application Priority Data

Mar. 27, 1998 (AU) .............................................. 2649/98

(51) Int. Cl.⁷ .............................................. G06T 15/30
(52) U.S. Cl. ........................ 345/423; 345/581; 345/619
(58) Field of Search ................ 345/423, 619, 345/581, 420, 419

(56) References Cited

U.S. PATENT DOCUMENTS

| | | | | |
|---|---|---|---|---|
| 5,428,719 A | * | 6/1995 | Sato | 395/129 |
| 5,506,947 A | * | 4/1996 | Taubin | 395/133 |
| 5,568,391 A | * | 10/1996 | McKee | 364/489.01 |
| 5,764,317 A | * | 6/1998 | Sadovnik et al. | 349/5 |
| 5,852,447 A | * | 12/1998 | Hosoya et al. | 345/468 |
| 6,081,766 A | * | 6/2000 | Chapman et al. | 702/27 |

* cited by examiner

Primary Examiner—Mark Zimmerman
Assistant Examiner—Huedung X. Cao
(74) Attorney, Agent, or Firm—Fitzpatrick, Cella, Harper & Scinto (57) ABSTRACT

A method of producing a mosaic effect in an image to be printed or displayed. The method includes the step of providing a first closed curve (1) and then generating regularly spaced boundary points (2) therealong. An area (4) adjacent the first closed curve (1) is then filled with generally regularly spaced fill points (6). The fill points (6) and boundary points (2) are triangulated to generate a series of polygons (8), thereby to generate a mosaic pattern in the area adjacent (4) the first closed curve (1). The polygons (8) are then rendered for printing, storage or display.

31 Claims, 6 Drawing Sheets

IMAGE PROCESSING METHOD FOR MOSAIC EFFECT WITH ADAPTIVE TESSELLATION

FIELD OF INVENTION

The present invention relates to a method for adaptively tessellating an arbitrary shape, defined by a closed curve, into a set of mosaic tiles.

BACKGROUND OF INVENTION

Mosaic tiles are relatively well known. In essence, an image is constructed using fragments of tiles or glass embedded in a cement mixture. The overall resolution is less than that which might be achieved by, say, painting the image. However, the fragmented appearance of the tiles in itself provides visual interest to an observer.

The effect provided by mosaic tiles has been imitated for application to digital images stored on a computer or the like. Typically, a series of control points is generated across a given image, and then joined to form tile edges. Each tile is then provided with a base colour associated with its position on the image. For example, the colour of a single pixel corresponding to a central point in the tile may be selected as the colour for the entire tile. Alternatively, some form of colour averaging may be used to produce a single colour.

Some software packages allow a user to manually define control lines corresponding to areas of interest, using a mouse or other input device. The control points and mosaic tiles are then generated on the basis of these control lines. However, this is a relatively labour intensive approach.

There is a desire to provide a visually interesting mosaic effect which reduces the randomness of tile placement whilst allowing areas defined by closed curves to be clearly delineated from other areas of an image.

SUMMARY OF INVENTION

Accordingly, the present invention provides a method of producing a mosaic effect in an image to be printed or displayed, the method including the steps of:
(a) providing a first closed curve;
(b) generating regularly spaced boundary points along the first closed curve;
(c) filling an area adjacent to the closed curve with generally regularly spaced fill points;
(d) triangulating the fill points and the boundary points to generate a series of polygons, thereby to generate a mosaic pattern in the area adjacent to the first closed curve; and
(e) rendering the polygons for printing, storage or display.

Preferably, the area adjacent to the first closed curve is within the first closed curve. It is further preferred that the method include the step of providing one or more secondary closed curves disposed within the first closed curve. In this case, the area adjacent the first closed curve is bounded internally by the secondary closed curve. The method then further includes a step (ii), prior to step (d), of generating regularly spaced secondary boundary points along each of the secondary closed curves, the secondary boundary points being triangulated with the boundary points and the fill points during step (d).

Preferably, step (d) includes the sub-step of converting at least some of the triangulated polygons into non-triangular polygons.

It is particularly desirable that step (c) includes the sub-steps of:
(ii) deriving from each of the boundary points a wavefront extending into an area adjacent the closed curve, the wavefront comprising a series of fill points, each fill point being a predetermined distance from its associated boundary point;
(iv) where multiple fill points fall within a predetermined distance of each other, combining the multiple fill points to generate a new fill point;
(v) using fill points generated by the wavefront and sub-step (iv) as new starting points for a new wavefront; and
(vi) iteratively repeating sub-steps (ii) to (v) until the area adjacent the closed curve is filled with approximately equally spaced fill points.

Other preferences and aspects of the invention will be apparent from the associated detailed description and the numbered paragraphs which follow.

BRIEF DESCRIPTION OF DRAWINGS

A preferred embodiment of the invention will now be described, by way of example only, with reference to the accompanying drawings, in which.

DETAILED DESCRIPTION OF PREFERRED EMBODIMENTS

Figure 3:
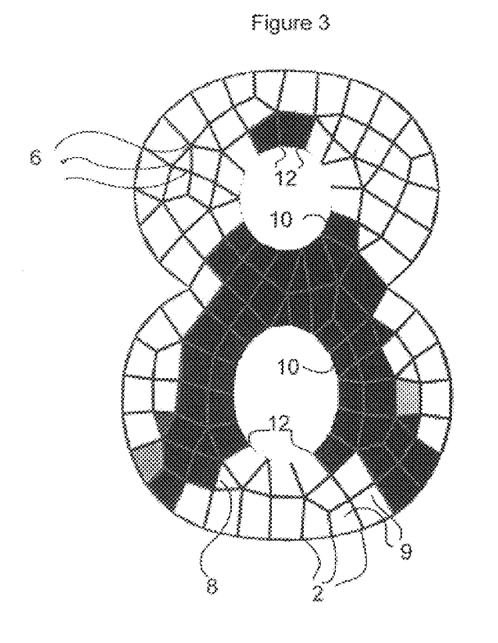
FIG. 3 shows the closed curve of FIG. 2 tessellated with a density of 0.5 and using the source image from FIG. 1.
Figure 4:
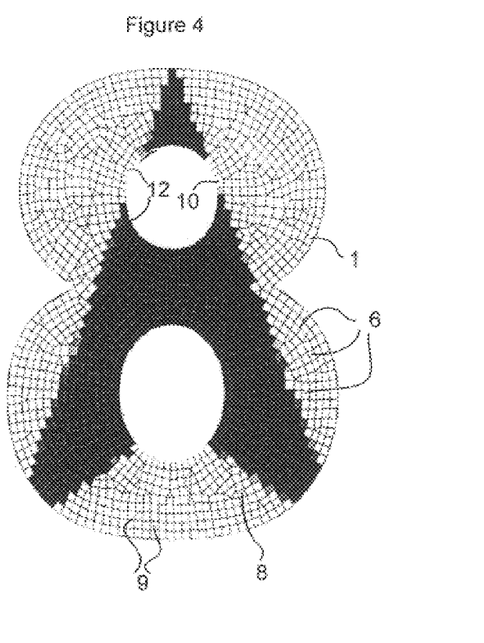
FIG. 4 shows a mosaic tessellation similar to that in FIG. 3, with a density of 0.9.
Figure 15:
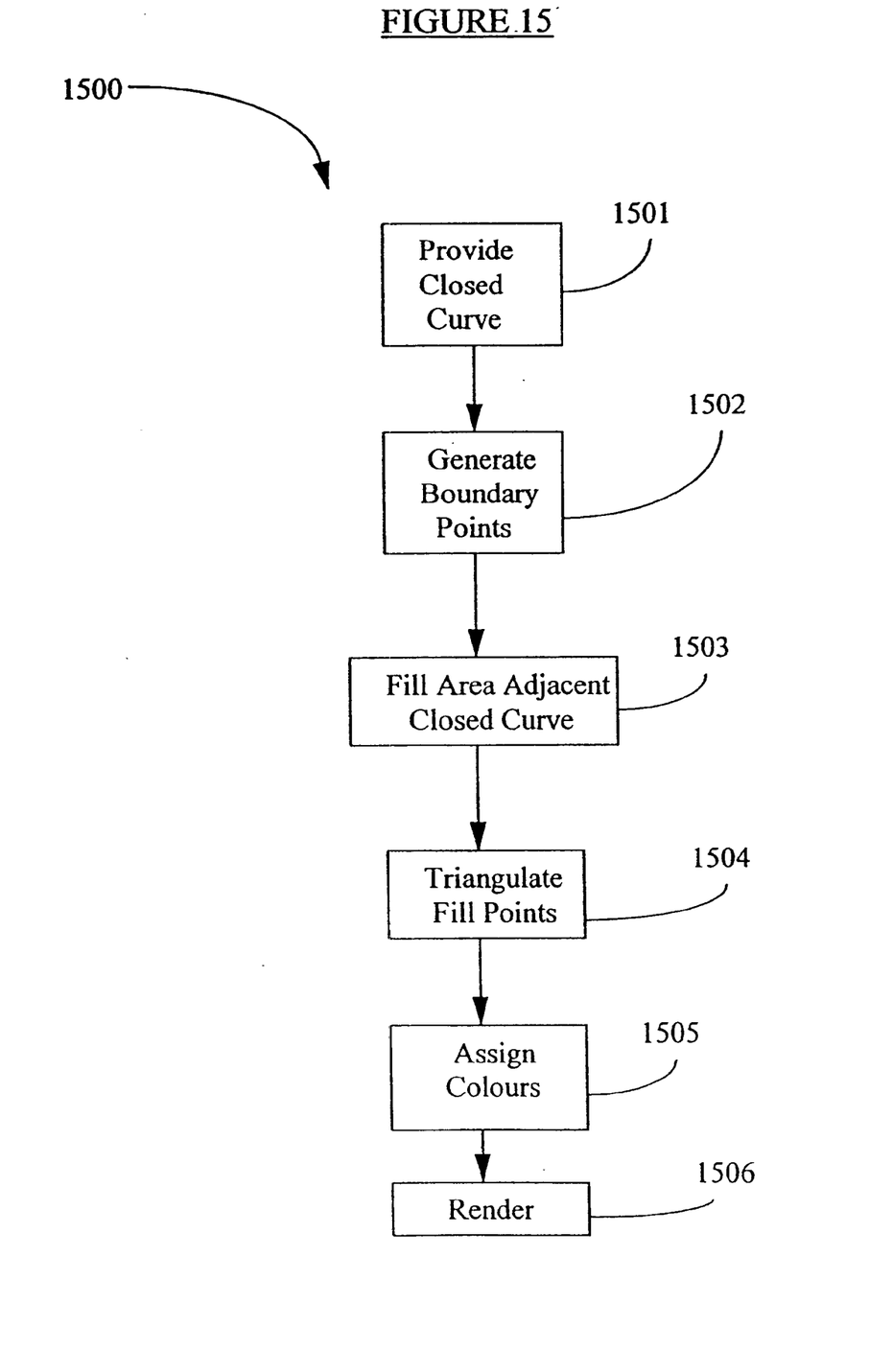
FIG. 15 is a flow chart of the steps for implementing the preferred embodiment of the invention.

Referring to the drawings, and particularly to FIGS. 3, 4 and 15, a preferred embodiment of the invention provides a method, described by flow chart 1500, of adaptively tessellating an area defined by a first closed curve 1 (provided in step 1501). The method involves generating regularly spaced boundary points 2 along the first closed curve 1 (step 1502), and filling an area 4 adjacent the closed curve with generally regularly spaced fill points 6 (step 1503). The fill points 6 and boundary points 2 are triangulated to generate a series of polygons (step 1504), thereby generating a mosaic pattern in the area adjacent the first closed curve. The polygons are then rendered (step 1506) for printing or display. As described in greater detail below, after triangulation, it is possible to assign colours to each of the resultant polygons (step 1505).

In its simplest form, the preferred embodiment of the invention provides triangular polygons 8, such as those which appear in parts of FIGS. 3 and 4. However, typically a substantial portion of these triangular polygons 8 will be converted into quadrilateral polygons 9 by means of known processes.

Typically, these processes will leave a small number of triangular polygons in areas where quadrilateral polygons would not be suitable such as the triangular polygons 8 left in FIGS. 3 and 4.

Usually, the closed curve will take the form of a template, such as a shape clipped from an image, or a predetermined character. In the Figures shown, the number "8" is used. The first closed curve 1 is a boundary curve, and the adjacent area 4 is located within that boundary. In this case, the method further includes the step of providing two secondary closed curves 10, which again define a boundary for the area adjacent the first closed curve 1. Regularly spaced secondary boundary points 12 are generated, and then triangulated when the fill points 6 and boundary points 2 are triangulated.

The fill points 6 may be generated by any suitable means. However, a preferred approach is to generate a wavefront (not shown) from each of the boundary points 2 and 12, extending into the area adjacent the closed curve 1. Each wavefront comprises a series of fill points, each of which is a predetermined distance from its associated boundary point. In the case where multiple fill points from adjacent waves fall within a predetermined distance of each other, the fill points are combined to generate a new, singular fill point. These new fill points generated by the wavefront are used as new starting points for subsequent wavefronts. The process is iteratively repeated until the entire area 4 is filled with approximately equally spaced fill points 6.

Figure 5:
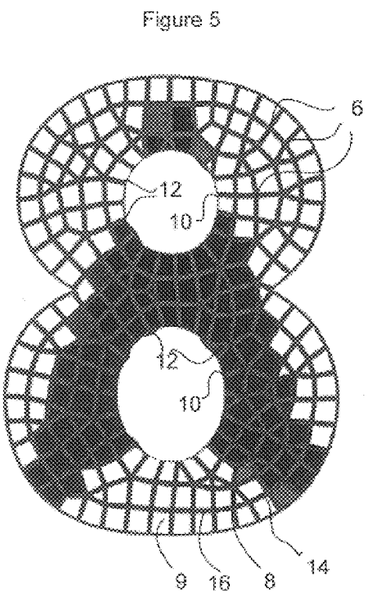
FIG. 5 shows a mosaic tessellation similar to that shown in FIG. 3, in which spacing between the tiles is 0.25.
Figure 6:
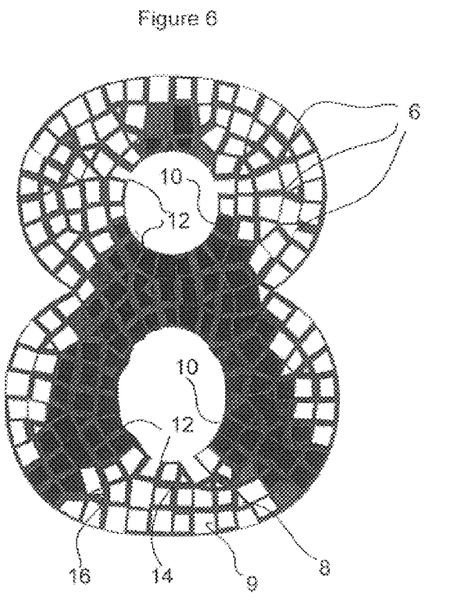
FIG. 6 shows a mosaic tessellation similar to that shown in FIG. 5, provided with a spacing variation between the polygons of 1.0.

In a preferred embodiment, the invention provides a means of simulating an appearance of grout 14 between the tiles, as shown in FIG. 5. In a preferred form, this is achieved by providing a background grouting image or texture which covers substantially all of the area 4 adjacent closed curve 1. The vertices of each polygon 8, 9 are then shifted towards a mid point of that polygon by a predetermined amount. The vertex shifted polygons are then rendered over the background grouting image, such that the background grouting image is visible through gaps 16 created between the polygons 8, 9. Typically, the amount by which the vertices of each polygon 8, 9 are shifted is selectable by a user. FIG. 5 illustrates an example in which a spacing value of 0.25 is used. As shown in FIG. 6, a random spacing variation factor may be introduced, which simulates the imperfect tiling which might be implemented by a human artist. Once again, this variation is a parameter which may be selected and altered by a user.

Figure 7:
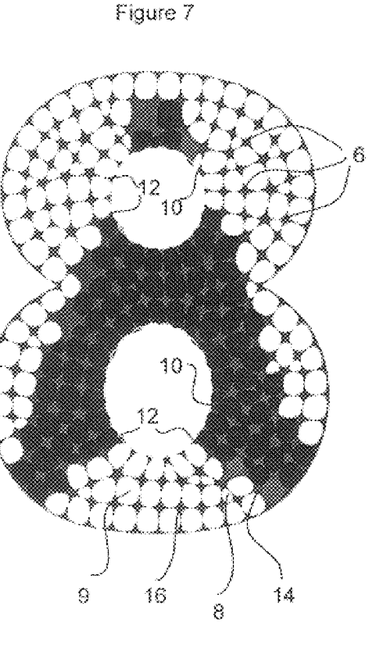
FIG. 7 shows a mosaic tessellation similar to that shown in FIG. 4, in which the polygons have been rounded with a factor of 0.4.
Figure 8:
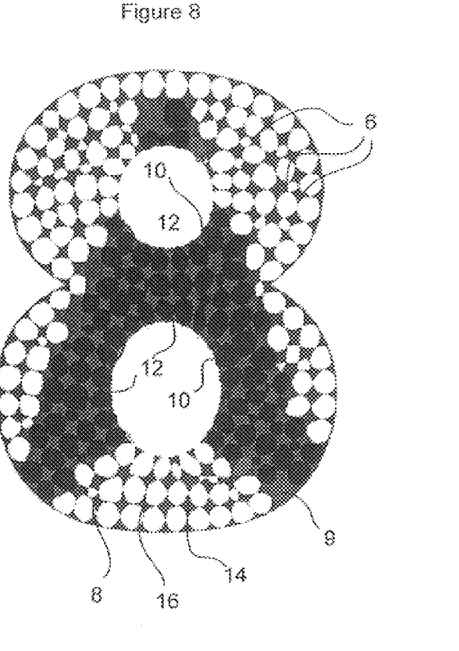
FIG. 8 shows a mosaic tessellation similar to that shown in FIG. 7, provided with a roundness variation of 1.0.
Figure 13:
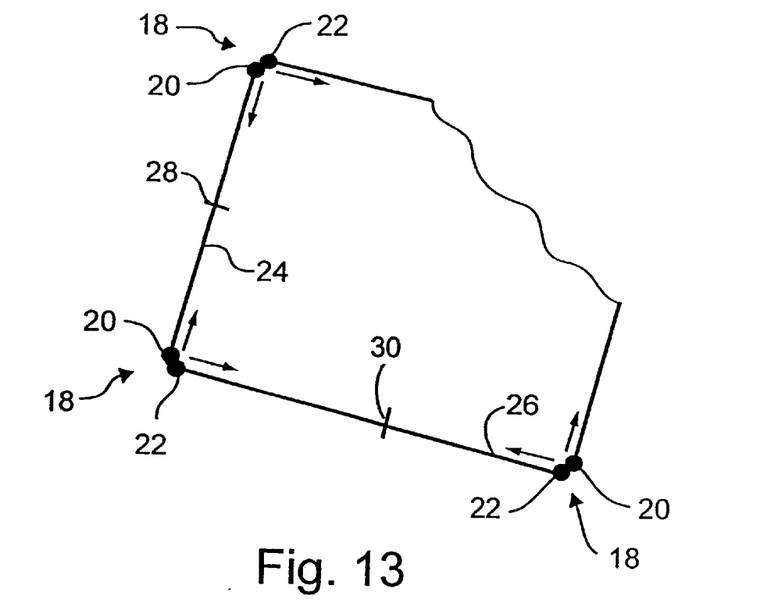
FIG. 13 is a detailed view of a polygon having control points at its corners for adjustment of a roundness factor.
Figure 14:
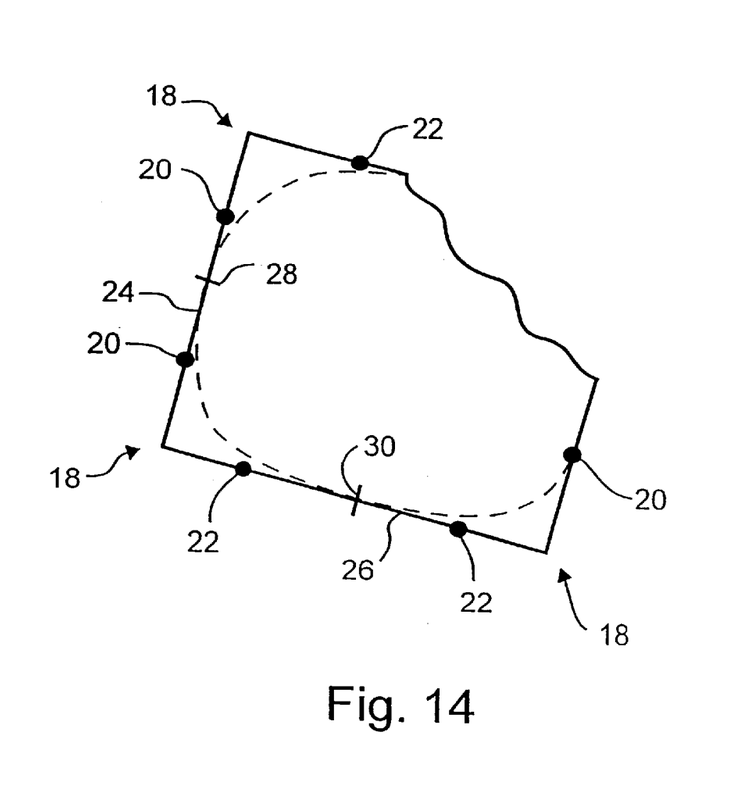
FIG. 14 shows the polygon of FIG. 13 with control points adjusted.

Yet another parameter which may be available is a roundness factor. As shown in FIG. 7, the roundness factor provides a pebble-like appearance to the tiles 8, 9, thereby providing yet another visually interesting effect. As best shown in FIGS. 13 and 14, in a preferred form, corners 18 of the polygons 8, 9 may be rounded by allocating a first control point 20 and a second control point 22 to each corner of each polygon. The first control point 20 is associated with a first side 24 extending away from the corner 18, whilst the second control point 22 is associated with a second side 26 extending away from the corner 18. On the basis of the roundness factor selected by the user, the first control point 20 is moved to a point between the corner 18 and a centre 28 of the first side 24. Similarly, the second control point 22 is moved to a point between the corner 18 and a centre 30 of the second side 26. A rounding function is then applied on the basis of the control points 20 and 22, thereby to provide rounded edges to the polygon. In a particularly preferred embodiment, the rounding function approximates a super-ellipse. As with the variable spacing of the polygons, the roundness factor may be subjected to a roundness variation which alters the amount of roundness applied to individual polygons. As shown in FIG. 8, this generates a more "human" pattern and a corresponding visually interesting appearance.

Figure 1:
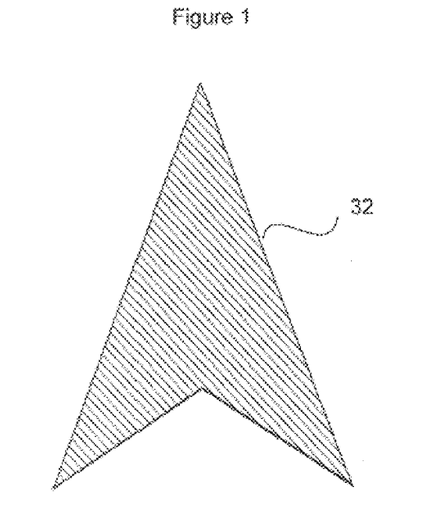
FIG. 1 is a source image for use with a preferred form of the invention.
Figure 2:
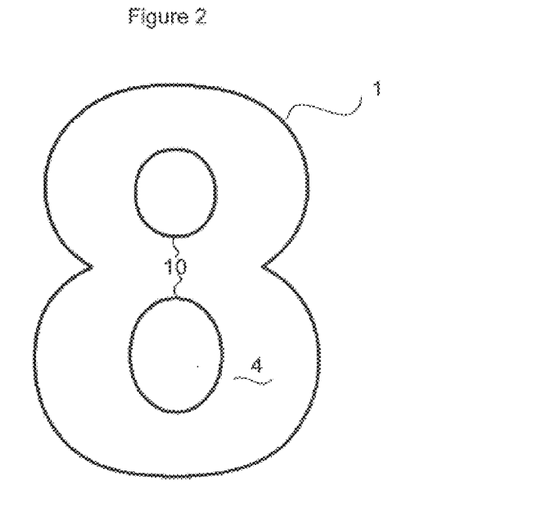
FIG. 2 shows a first closed curve for use with the preferred embodiment.

In a particularly preferred form, each of the polygons has an associated base colour, the base colours of the mosaic pattern as a whole presenting a mosaic image. In the preferred form shown in the drawings, the mosaic image is based on a source image 32, such as that shown in FIG. 1. The source image may be extracted from an original image (not shown), either manually by means of a user controlled input device, or adaptively by means of colour quantisation, shape analysis, edge detection, or the like.

Typically, the base colour associated with each polygon is ascertained by sampling a corresponding point of the source image 32. Usually, the colour will be sampled from the source image 32 at a point corresponding to the centre of each polygon 8, 9. Alternatively, the colour of each polygon may be determined by calculating an average colour of source image pixels within a region corresponding to that polygon.

Figure 9:
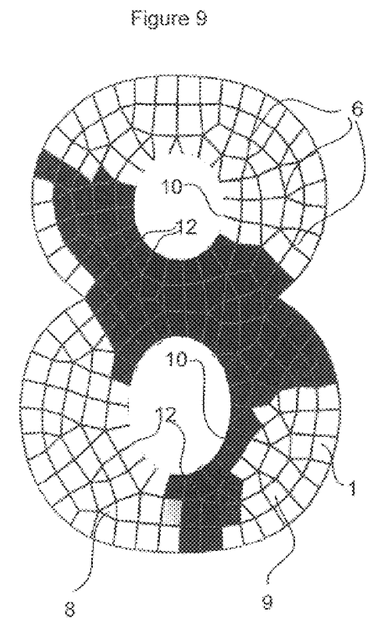
FIG. 9 shows a mosaic tessellation similar to that shown in FIG. 4, with the source image rotated by 45°.
Figure 10:
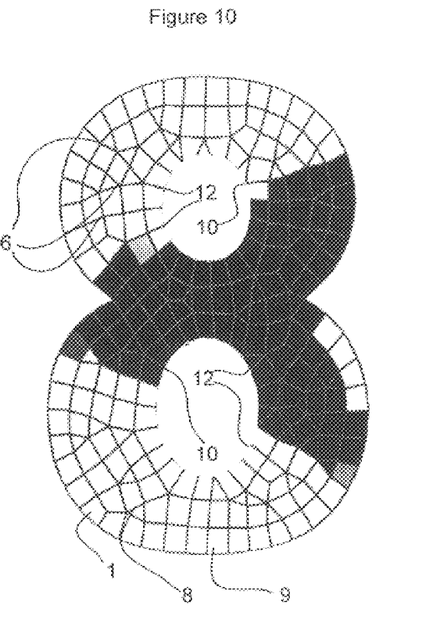
FIG. 10 shows a mosaic tessellation similar to that shown in FIG. 9, with the source image rotated by 90°.

When mapping the source image 32 to the polygons, any polygons which fall outside the source image 32 may be remapped by a wrap-around function. This ensures that, even if the source image 32 is transformed by, for example, rotation (as shown in FIGS. 9 and 10), no tile will be left undefined in terms of its colour.

Figure 11:
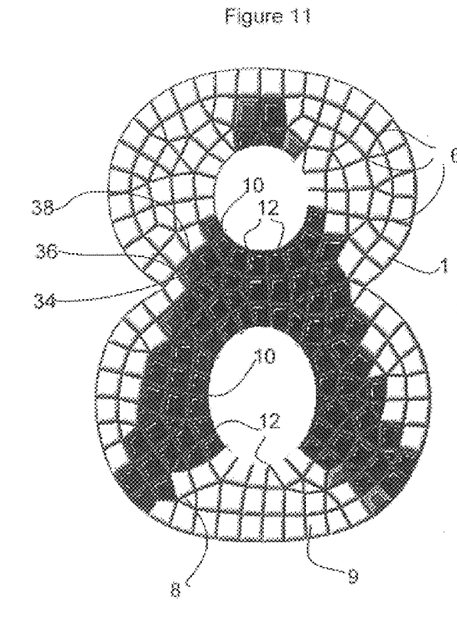
FIG. 11 shows a mosaic tessellation similar to that shown in FIG. 4, to which a lighting model has been applied.
Figure 12:
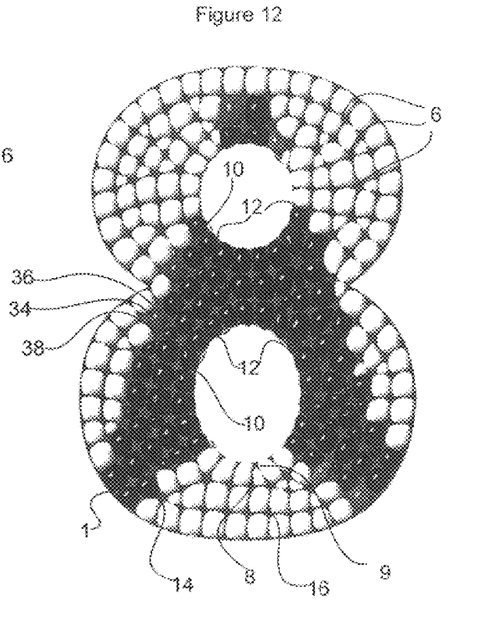
FIG. 12 shows a mosaic tessellation similar to that shown in FIG. 11, in which the lighting model has been applied to polygons with a high "roundness" factor.

In a preferred embodiment, the invention may also include the application of a lighting model to the polygons 8, 9, thereby to generate a three-dimensional effect. Examples of this are shown in FIGS. 11 and 12, applied to square and rounded tiles respectively. The lighting model may include a specular glint element 34 for each polygon, as well as a diffuse highlight element 36 and a diffuse shadow element 38.

In one embodiment (not shown), the invention includes the step of providing the effect of missing or scattered tiles. This may be achieved by removing randomly selected tiles from the mosaic, and translating or rotating the positions of randomly selected tiles from the remaining group. Tiles to be removed from the mosaic should be selected such that tiles immediately adjacent the closed curve have a greater chance of being removed than those adjacent a central portion of the mosaic. Tiles have a progressively lower chance of being removed depending upon how far they are from the closed curve.

Scattered tiles can be moved or rotated such that they do not intersect other tiles. Accordingly, maximum tile scatter should take place in regions of maximum missing tiles, which will typically be adjacent the closed curve. Also, tiles should be scattered by moving them away from adjacent tiles, preferably in a random fashion.

In a preferred embodiment, the present invention is implemented as a computer application program running under Windows™, an operating system developed by Microsoft Corporation. However, it will be appreciated that other operating systems, such as UNIX™, OS/2™ and DOS™, can also be used The application program has a user interface which includes on-screen menus and other controls that respond to mouse and keyboard input. Where necessary, the application program is configured to transmit data to one or more printers either directly connected to a host computer or accessed over a network. The application program also has the ability to transmit and receive data to a connected digital telecommunications network (for example, the Internet).

Figure 16:
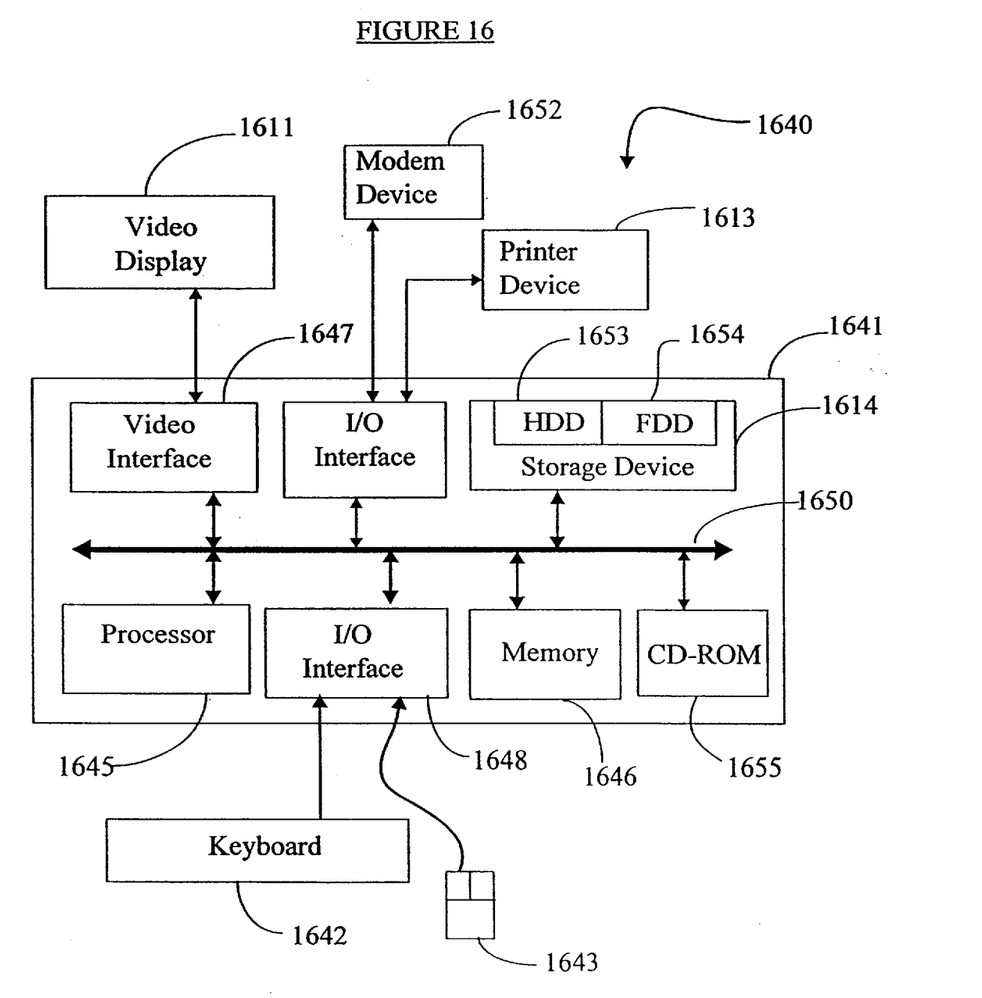
FIG. 16 is a schematic diagram of a general-purpose computer programmable to implement the preferred embodiments of the invention.

In a preferred form, preferred embodiments of the invention are implemented on a conventional general-purpose (host) computer system, such as the computer system 1640 shown in FIG. 16. The application program discussed above (and thereby the preferred embodiments of the invention described with reference to the other drawings) is implemented as software executed on the computer system 1640.

The computer system 1640 includes a computer module 1641, input devices such as a keyboard 1642 and mouse 1643, and output devices including a printer 1613 and a display device 1611. A modulator-demodulator ("modem") transceiver device 1652 is used by the computer module 1641 for communication via a telecommunications network, such as a telephone line, Local Area Network ("LAN") or Wide Area Network ("WAN"). The modem 1652 can also be used to access the Internet to other telecommunications networks.

The computer module 1641 includes a number of functional components, including (in the embodiment shown):

a processor unit 1645;

a memory unit 1646 including semiconductor Random Access Memory ("RAM") and Read Only Memory ("ROM"); and input/output ("I/O") interfaces including a video interface 1647;

an I/O interface 1648 for the keyboard 1642 and mouse 1643;

a storage device 1614, including a hard disk drive 1653 and a floppy disk drive 1654; and a CD-ROM drive 1655 for use as a non-volatile source of data.

The components 1645 to 1649 and 1653 to 1655 of the computer module 1641 communicate via an interconnecting bus 1650 in a manner that results in conventional operation of the computer system 1640, as known to those in the relevant art. Examples of computers on which the embodiments can be practised include IBM-PC's and compatibles, and Sun Sparcstations.

Typically, the application program of the preferred embodiment is resident on a hard disk drive 1653 and read and controlled using the processor 1645. Intermediate storage of the program and the print list and any data fetched from the network may be accomplished using the semiconductor memory 1646, possibly in concert with the hard disk drive 1653. In some instances, the application program may be supplied to the user encoded on a CD-ROM or floppy disk, or alternatively could be read by the user from the network via the modem device 1652.

At least in a preferred embodiment, the present invention provides a means of relatively easily generating a mosaic effect for a given closed curve. By doing so, a visually interesting effect is generated without the need for manual input or relatively small tiles. For these reasons, the present invention represents a commercially significant advance over the prior art.

Although the invention has been described with reference to a number of particular embodiments, it will be appreciated by those skilled in the art that the invention may be embodied in many other forms.

The claims defining the invention are as follows:

1. A method of producing a mosaic effect in an image to be printed or displayed, the method including the steps of:
   (a) a provide step, of providing a first closed curve;
   (b) a generation step, of generating boundary points regularly spaced along the first closed curve;
   (c) a fill step, of filling an area adjacent the first closed curve with fill points generally regularly spaced from the boundary points;
   (d) a triangulate step, of triangulating the fill points and the boundary points to generate a series of polygons, thereby to generate a mosaic pattern in the area adjacent the first closed curve; and
   (e) a render step, of rendering the polygons for printing, storage or display.

2. A method according to claim 1, wherein the area adjacent the first closed curve is within the first closed curve.

3. A method according to claim 2, further including the step of providing one or more secondary closed curves disposed within the first closed curve, the area adjacent the first closed curve being bounded internally by the secondary closed curves, the method further including a step (ii), prior to step (d), of generating secondary boundary points regularly spaced along each of the secondary closed curves, the secondary boundary points being triangulated with the boundary points and fill points during step (d).

4. A method according to claim 1, wherein step (d) includes the sub-step of converting at least some of the triangulated polygons into non-triangular polygons.

5. A method according to claim 1, wherein step (c) includes the following sub-steps:
   (iii) deriving from each of said boundary points a wave front extending into an area adjacent the closed curve, the wave front comprising a series of fill points, each fill point being a predetermined distance from its associated boundary point;
   (iv) where multiple fill points fall within a predetermined distance of each other, combining the multiple fill points to generate a new fill point;
   (v) using fill points generated by the wave front and sub-step (iv) as new starting points for a new wave front; and
   (vi) iteratively repeating sub-steps (iii) to (v) until the area adjacent the closed curve is filled with approximately equally spaced fill points.

6. A method according to claim 1, further including the step of generating an appearance of grout between the tiles.

7. A method according to claim 6, wherein the step of generating an appearance of grout between the tiles includes the sub-steps of:
   (vii) providing a background grouting image covering substantially all of the area adjacent the closed curve;
   (viii) shifting vertices of each polygon towards a midpoint thereof by a predetermined amount; and (ix) compositing the vertex-shifted polygons over the background grouting image, such that the background grouting image is visible through gaps created between the polygons.

8. A method according to claim 7, wherein the predetermined amount referred to in sub-step (viii) is a parameter, the value of which is selectable by a user.

9. A method according to claim 1, further including the step of rounding corners of at least some of the polygons.

10. A method according to claim 9, wherein the step of rounding the corners of the polygons includes the sub-steps of:

allocating a first control point and a second control point to each corner of each polygon, the first control point being associated with a first side extending away from the corner and the second control point being associated with a second side extending away from the corner;

moving the first control point to a point between the corner and a centre of the first side and moving the second control point to a point between the corner and a centre of the second side; and using a rounding function to round the corner between the first and second control points, for each corner of the polygon.

11. A method according to claim 10, wherein the rounding function approximates a superellipse.

12. A method according to claim 10, wherein the rounding amount by which the first and second control points are moved along the first and second sides respectively is based on a roundness parameter.

13. A method according to claim 12, wherein the roundness factor is selected by a user from a range of possible values.

14. A method according to claim 12, wherein the roundness factor represents a proportion of the first and second sides by which the first and second control points respectively are moved.

15. A method according to claim 1, wherein each of the polygons has an associated base colour, the base colours of the mosaic pattern as a whole presenting a mosaic image.

16. A method according to claim 15, further including a step (i) in which, prior to step (a), the mosaic image is based on a source image.

17. A method according to claim 16, wherein step (i) includes the sub-step of extracting the source image from an original image, by means of colour quantisation, shape analysis or edge detection.

18. A method according to claim 16, wherein step (i) includes the sub-step of a user manually extracting the source image from the original image.

19. A method according to claim 16, wherein the base colour associated with each polygon is ascertained by sampling a corresponding point of the source image.

20. A method according to claim 19, wherein the colour is sampled from the source image at a point corresponding to the centre of each polygon.

21. A method according to claim 19, further including the step of remapping tiles which fall outside the source image to a point within the source image, thereby to wrap the source image within the mosaic pattern.

22. A method according to claim 1, wherein the colour of each polygon is determined by calculating an average colour of the source image pixels within a region corresponding to that polygon.

23. A method of producing a mosaic effect in an image to be printed or displayed, the method including the steps of:

(a) providing at least one closed curve defining a shape of a graphic object;

(b) tessellating said graphic object into a plurality of polygon regions, having a plurality of vertex points;

(c) creating an individual polygon shape for each of said polygon regions, wherein each of said individual polygon shapes is derived from a corresponding polygon region, and each polygon shape has a corresponding set of vertex points; and (d) mapping one or more colours to each polygon shape.

24. A method according to claim 23, wherein each polygon shape is modified by manipulating said corresponding set of vertex points.

25. Apparatus for producing a mosaic effect in an image to be printed or displayed, the apparatus including:

(a) delivery means for providing a first closed curve;

(b) point generation means for defining boundary points regularly spaced along the first closed curve;

(c) fill means for filling an area adjacent the first closed curve with fill points generally regularly spaced from the boundary points; and (d) polygon generation means for triangulating the fill points and the boundary points to generate a series of polygons, thereby to generate a mosaic pattern in the area adjacent the closed curve.

26. Apparatus according to claim 25, wherein the polygon generation means are configured to convert at least some of the triangulated polygons into non-triangular polygons.

27. Apparatus according to claim 25, wherein the fill means includes:

wave front generation means for generating a wave front from each boundary point into the area adjacent the closed curve, the wave front comprising a series of fill points each being a predetermined distance from its associated boundary point; and combining means for combining into a new fill point multiple fill points which fall within a predetermined distance of each other;

wherein the wave front generation means uses fill points associated with previously generated wavefronts as starting points for new wavefronts, until the area adjacent the closed curve has been filled with fill points.

28. A computer storage medium bearing one or more computer software programs for execution on a computer, the computer software program or programs including compiled or uncompiled software instructions for implementing a method of producing a mosaic effect in an image to be displayed on a display device, stored or printed, including instructions for implementing the following steps:

(a) providing a first closed curve;

(b) generating boundary points regularly spaced along the first closed curve;

(c) filling an area adjacent the first closed curve with fill points generally regularly spaced from the boundary points;

(d) triangulating the fill points and the boundary points to generate a series of polygons, thereby to generate a mosaic pattern in the area adjacent the first closed curve; and (e) rendering the polygons for printing, storage or display.

29. A method of producing a mosaic effect in an image to be printed or displayed, the method including the steps of:

(a) providing a first closed curve;

(b) generating regularly spaced boundary points along the first closed curve;

(c) filling an area adjacent the first closed curve with generally regularly spaced fill points;

(d) generating a series of polygons on the basis of the fill points and the boundary points, thereby to generate a mosaic pattern in the area adjacent the first closed curve;

(e) providing a background grouting image covering substantially all of said area adjacent the first closed curve; and (f) rendering the polygons and said background grouting image for printing, storage or display.

30. Apparatus for producing a mosaic effect in an image to be printed or displayed, the apparatus including:

(a) delivery means for providing a first closed curve;

(b) point generation means for defining regularly spaced boundary points along the first closed curve;

(c) fill means for filling an area adjacent the first closed curve with generally regularly spaced fill points;

(d) polygon generation means for generating a series of polygons on the basis of the fill points and the boundary points, thereby to generate a mosaic pattern in the area adjacent the closed curve; and (e) grouting image providing means for providing a background grouting image covering substantially all of said area adjacent the first closed curve.

31. A computer storage medium bearing one or more computer software programs for execution on a computer, the computer software program or programs including compiled or uncompiled software instructions for implementing a method of producing a mosaic effect in an image to be displayed on a display device, stored or printed, including instructions for implementing the following steps:

(a) providing a first closed curve;

(b) generating regularly spaced boundary points along the first closed curve;

(c) filling any area adjacent the first closed curve with generally regularly spaced fill points;

(d) generating a series of polygons on the basis of the fill points and the boundary points, thereby to generate a mosaic pattern in the area adjacent the first closed curve; and (e) providing a background grouting image covering substantially all of said area adjacent the first closed curve; and (f) rendering the polygons and said background grouting image for printing, storage or display.

* * * * *

UNITED STATES PATENT AND TRADEMARK OFFICE
CERTIFICATE OF CORRECTION

PATENT NO.    : 6,476,809 B1
DATED         : November 5, 2002
INVENTOR(S)   : Cameron Bolitho Browne It is certified that error appears in the above-identified patent and that said Letters Patent is hereby corrected as shown below:

Column 3,
Line 54, "mid point" should read -- midpoint --.

Column 6,
Line 14, "including the steps of:" should read -- including: --.

Column 7,
Line 40, "base colour," should read -- base color, -- and "base colours of" should read -- base colors of --;
Line 47, "of colour" should read -- of color --;
Line 53, "colour associated" should read -- color associated --;
Line 55, "the colour" should read -- the color --;
Line 62, "the colour of" should read -- the color of --; and
Line 63, "average colour" should read -- average color --.

Column 8,
Line 10, "more colours" should read -- more colors --.

Signed and Sealed this

Eighth Day of July, 2003

JAMES E. ROGAN
*Director of the United States Patent and Trademark Office*